UNITED STATES PATENT OFFICE.

JOHN CURRAN, OF BAY CITY, MICHIGAN.

PROCESS FOR MANUFACTURING SALT.

SPECIFICATION forming part of Letters Patent No. 238,659, dated March 8, 1881.

Application filed October 8, 1880. (No Specimens.)

*To all whom it may concern:*

Be it known that I, JOHN CURRAN, of the city and county of Bay, and State of Michigan, have invented an Improvement in Process for Manufacturing Salt, of which the following is a specification.

The nature of my invention relates to new and useful process for the manufacture of salt; and the invention consists, primarily, in a compound employed to facilitate the deposit of the salt when granulated; and, secondarily, in the process of manufacturing salt, as more fully hereinafter described.

The brine having been settled, drawn into the grainers, and brought to a point of saturation, in the usual way, I employ a compound which, in small quantities, is placed upon the surface of the brine in the grainer, where it melts and is spread over the surface to facilitate the granulation and deposit of the salt.

The compound is made as follows: I take three pints of distilled water and heat it, being careful not to heat it to the boiling-point, and dissolve in it one pound of the carbonate of soda. After the soda is dissolved I add five pounds of sweet tallow, which melts, the water being warm enough for that purpose, and then allow the mass to solidify by becoming cool.

I do not desire to confine myself to the exact proportions named, as they may be varied somewhat without departing from the spirit of my invention and as varying conditions of brine may require.

By the use of this compound, used in the manner described, I am enabled to obtain a greater quantity of salt from a given quantity of brine, to sweeten a large proportion of the bitter water resultant from the ordinary processes employed in the manufacture of salt, and very largely to prevent corrosion of the steam-pipes in the grainer.

What I claim as my invention is—

1. The process herein described for the manufacture of salt, consisting in evaporating the brine in grainers, and perfecting the same by the employment of the compound hereinbefore described.

2. As a means to be employed in the manufacture of salt, the compound consisting of the ingredients and in the proportions substantially as specified.

JOHN CURRAN.

Witnesses:
  H. S. SPRAGUE,
  A. WAHL.